UNITED STATES PATENT OFFICE.

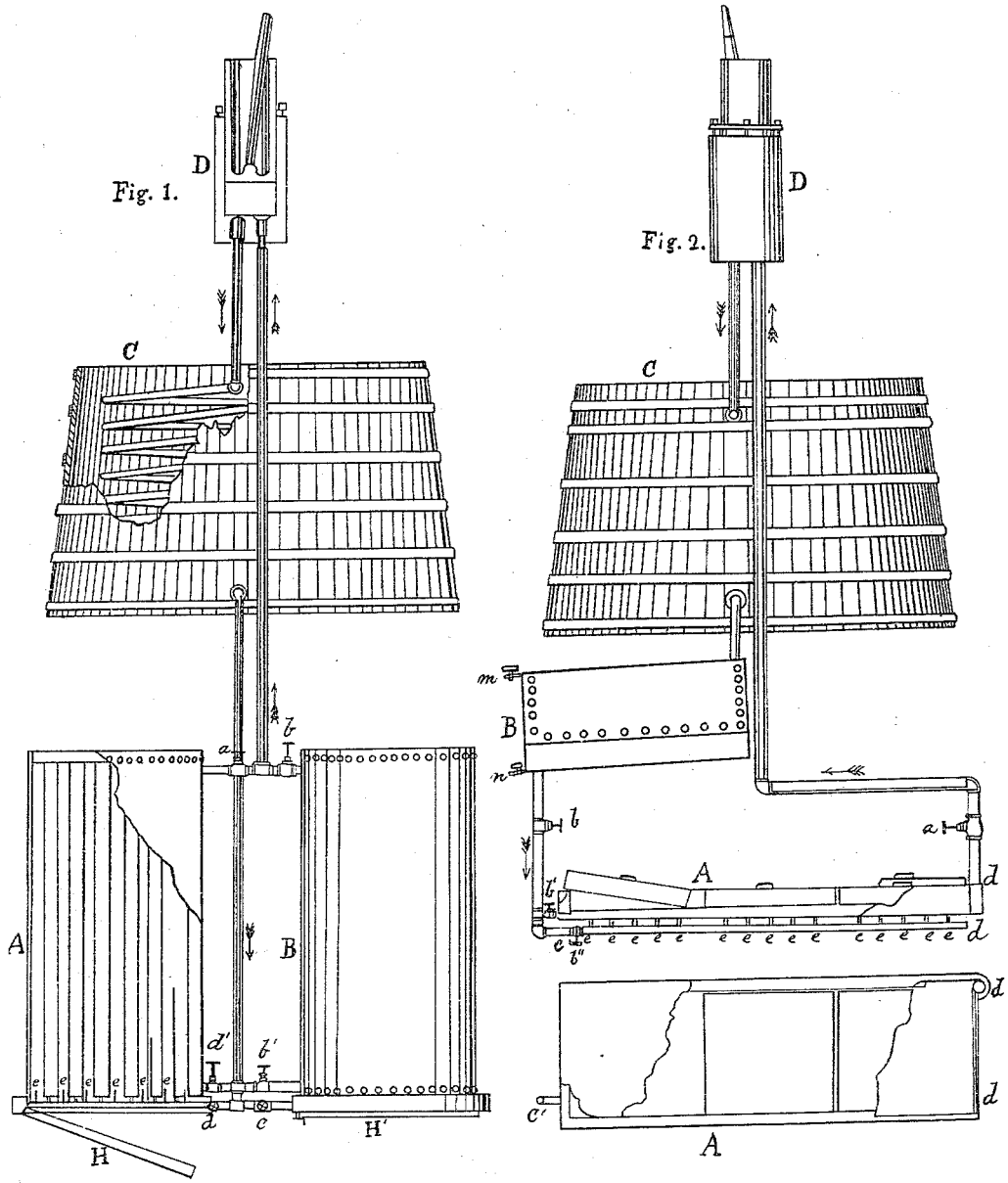

P. H. VANDER WEYDE, M. D., OF PHILADELPHIA, PENNSYLVANIA.

IMPROVED MACHINE FOR THE MANUFACTURE OF ICE.

Specification forming part of Letters Patent No. 87,084, dated February 16, 1869.

*To all whom it may concern:*

Be it known that I, P. H. VANDER WEYDE, M. D., of the city and county of Philadelphia, State of Pennsylvania, have invented an Improvement in the Machine for the Manufacture of Ice.

My improvement is chiefly adapted to the use of naphtha, gasoline, rhigolene, petroleum, ether, or the condensed petroleum-gas or chimogene, for the application of which substances to the manufacture of ice and of cooling in general a patent was granted to me April 30, 1867.

My machine consists chiefly in an exhaust and force pump, D, and cooling-coil C. The first produces a vacuum in the refrigerating-vessels, afterward to be described, and condenses the gases in the coil C, where a stream of cold water around it and around the pump and its piston prevents the heating consequent to all powerful condensation.

Of the refrigerators, I have two kinds. In Figure 1 is represented one to produce the round cylindrical pieces of ice, the most common form of the artificial ice, as being the easiest produced. The other kind of refrigerator, represented in Fig. 2, produces square, flat pieces, similar to those cut in winter out of natural ice.

The first kind of apparatus is represented in the accompanying drawing, Fig. 1. A pair of them is used in each machine—namely, A and B. They are made of boiler-iron, provided interiorly with tubes, and are very similar to upright tubular steam-boilers, as the figure indicates.

One of these vessels, say A, is fitted around the tubes, with the condensed petroleum-gas, chimogene, or other very volatile liquid. The water to be frozen is placed in the tubes, after stopping them up from below; the stop-cocks $a$ and $b'$ are opened and $a'$ and $b$ shut; it is seen by the position of the valves at the bottom of the pump D that the air or gas will be exhausted from A and pressed through the coil C into the vessel B. During this operation the liquefied gas or chimogene will continually be kept boiling in A, and hereby take so much heat from the water in the tubes, being absorbed by the gas or latent heat, that the temperature will descend far below the freezing-point and the water solidify. The amount of water in the tubes bears to the amount of chimogene around them such a proportion that the water is frozen when the volatilization of the chimogene is completed, and all this liquid transferred to the vessel B. Then the operation is simply reversed. The pump D is kept in motion, only the stop-cocks $a$ and $b'$ are shut, and $a'$ and $b$ opened. Now the gas will be exhausted from B and pressed through the same coil C into A. This will raise the temperature of A a little, so that the ice-cylinders will become loosened by melting at their surface, and they will drop out, after removing the props below. The tubes in B are now filled with water, and the freezing will take place in this vessel. The condensation will take place in A; and in this way we have an alternate action between the two vessels. The same gas is used over and over again, and the pump kept in uninterrupted motion by a small steam-engine.

When sometimes the ice in the tubes of the vessel A is not frozen to the desired hardness, after the volatile liquid is entirely evaporated, the small jets $e\ e\ e$ are provided at the bottom, which by opening a stop-cock at $d$, or $d$ and $c$, will propel a spray of liquid between the tubes containing the water and ice, which spray may be derived directly from the pump or from the other vessel B.

The tubes containing the water are surrounded with a coating of well-fitting thin flannel, which, by its capillary action, absorbs the volatilizing cooling-liquid, and keeps this in constant contact with the freezing-tubes.

H is a hinged cover, serving to keep the stoppers of the water-tubes in place. It is represented open in H and closed in H'.

Fig. 2 represents the arrangement as modified to make square blocks of ice. In this arrangement the pump D and condensing-coil C are the same as in Fig. 1; but in place of the cylindrical tubular vessel, I use a rectangular hollow vacuum-box, made of strong sheet-iron, and provided with stays, to withstand the outer atmospheric pressure consequent on the vacuum produced in it by the pump D. It is provided with jets inside, $e\ e\ e\ e$, which produce a spray of the liquid or liquefied petroleum-gas, and cause a great cold by its sudden evaporation and expansion in the vacuum. The vessel B serves to receive the condensed gas or liquid from the pump D and coil C. A sufficient provision is here kept up to produce a continuous spray in the vessel A. *m* and *n* are two stop-cocks, to discharge air and water which may collect in this vessel B from the pump A.

The upper side of the vessel or box A consists of a rectangular shallow chloride-of-calcium or mercury bath, in which square iron dishes are plunged containing the water to be frozen. They are protected from above by non-conducting covers, like also the whole vessel A is protected from outside radiation by a non-conducting covering, which again is surrounded by a water-tight envelope, to prevent atmospheric moisture from condensing against or in this covering.

This whole box A and bath are, by means of the vacuum-pump A and the jets *e e e e*, kept at about 4° to 20° Fahrenheit. The water placed in the shallow dishes is rapidly frozen to square plates of ice.

In order to loosen the ice from those dishes, they are placed on a similar box as A, containing the water to be frozen, which thus, by giving some of its heat to melt out the ice formed, is partially cooled before being placed in the freezing-dishes.

It is, of course, understood that also the vessels A and B, Fig. 1, are to be protected from exterior heat by felt, as used for protecting steam-boilers from losing heat by radiation, but that this covering besides must be coated by water-proof sheet-rubber or oil-cloth, to prevent atmospheric moisture from condensing against it, which moisture would make the felt a conductor of heat, and seriously interfere with the proper working of the machine.

The arrangement, Fig. 1, is also very appropriate to use without filling the tubes with water, leaving them open at both ends and giving the air free circulation through them. By the cold this air will, of course, continually descend in these tubes and come out of their lower ends cooled below the freezing-point. In admitting this air in a closed room or storehouse of provisions, its temperature may be kept constantly at any desired low degree of temperature without the use of ice by the simple working of the vacuum-pump D and the use of the jets *e e e e e*.

The same arrangement may also be used for simply cooling water without freezing it. For this purpose the lower hinged cover H is closed water-tight, and provided with a tap and stop-cock. The water which is admitted from above and cooled by slowly passing through the tubes is allowed to flow off below, at a temperature lower in proportion that the evaporation of the petroleum-ether is more rapid or the flow of the water more slow.

When it is desired to perform the freezing or cooling of water in other vessels, the low temperature of the vessel A may be transferred to any other vessel by replacing this last-mentioned flowing water by a strong solution of salt, chloride of calcium, glycerine, crude petroleum, or any other liquid which will not freeze at the temperature employed. The liquid thus cooled to 20° or 10° Fahrenheit, may be conducted in the vessel B, Fig. 1, or A, Fig. 2, and accomplish the freezing there or it may be conducted in or around any other proper cooling or freezing apparatus, and continually return to the top of the vessel A, Fig. 1. In this case the vessel B, Fig. 1, is either not used or never employed to produce a vacuum in it.

As it is of the utmost importance to produce the vacuum as rapidly and perfectly as possible, the success of the operation depends to a great extent on the construction of the pump employed. I found after many trials that the best pump is simply made like a common steam-cylinder and piston, of at least one foot diameter and two or three feet stroke, placed in vertical position, and entirely submerged in running water, in order to keep cool, and the packing of the piston-rod tight. This pump is provided with three sets of valves, the first very large in the upper cylinder-head, the second also large in the piston, and the third, which may be much smaller, in the lower cylinder head or bottom. They all open downward and close by upward pressure. The upper valve is, by means of a tube of sufficient diameter, connected with the vessel containing the volatile liquid to be evaporated, the lower valve with the narrower cooling coil and vessel into which it is recondensed. It is clear that by each downward stroke, the piston-valve closing, the vapor will fill the cylinder by the valve from above, and that by the upward stroke this upper valve will close, and the piston-valve opening itself will allow the vapor to pass the piston and fill the lower part of the cylinder, to be expelled from below at the next downward stroke. The vapor will thus pass entirely through the pump, and the partial compressions and re-expansions are avoided, which always take place in other pumps where the piston is not provided with valves, and the gases and vapors are alternately expanded and compressed under the piston in the pump-cylinder. In this arrangement the piston moves *in vacuo* which is not the case when it possesses no valves, and one of the best methods for this valve attachment is to make the valve large and conical, with the base upward, and attached to the piston-rod, so that it closes by the downward stroke, and pushes the piston downward, and opens by the upward stroke, pulling the piston upward by a separate attachment.

It is seen that by the downward stroke only the piston-valve is closed, the others open. By the upward stroke the piston-valve alone is open; the two other sets are closed.

What I claim, and wish to secure by Letters Patent, is—

1. The freezing and cooling apparatus described, acting by means of evaporation *in vacuo* of any of the volatile products of petroleum, and manufacturing ice, cooling air or water, or producing any artificial cold in general.

2. The application of the peculiar pump arrangement, as described, and for the purposes specified.

P. H. VANDER WEYDE, M. D.

Witnesses:
   W. D. EVERIT,
   LEWIS FRANCIS.